Figure 1:
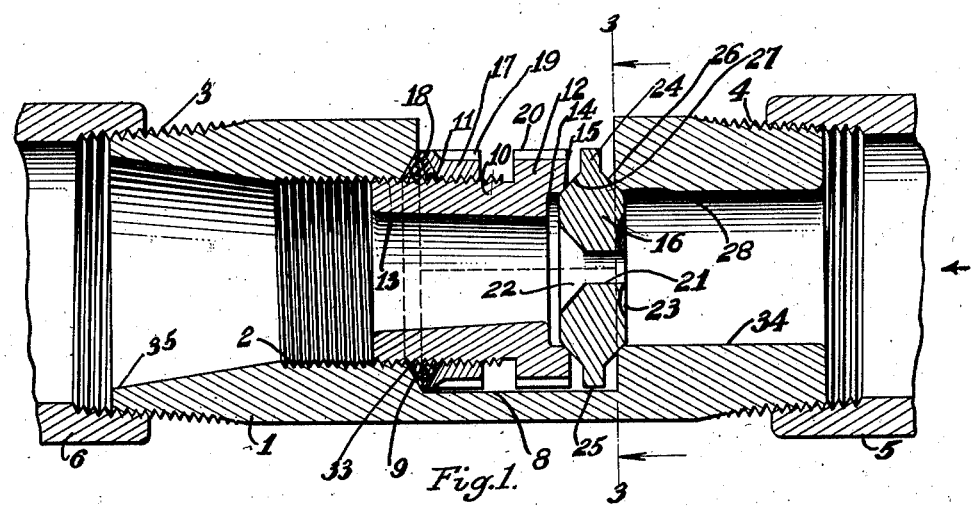

April 3, 1934. T. K. HOLTANE 1,953,110

FLOW BEAN

Filed Dec. 9, 1930

INVENTOR,
Theodore K. Holtane;
BY
ATTORNEY

Patented Apr. 3, 1934

1,953,110

UNITED STATES PATENT OFFICE 1,953,110

FLOW BEAN

Theodore K. Holtane, Los Angeles, Calif.

Application December 9, 1930, Serial No. 501,048

1 Claim. (Cl. 137—75)

This invention relates to flow beans, and has for an object the provision of a flow bean in which the orifice plate may be readily removed or replaced and in such a manner that leakage around the orifice plate is effectively prevented.

At the present time, so far as the inventor is aware, the average flow bean for use in oil well practice presents numerous defects in that it is difficult to replace the orifice plate, necessitating a complete interruption of fluid flow through pipes, and does not have the orifice plate so arranged as to maintain any packing adjacent the plate out of direct flow path of fluid.

An object of the present invention is to provide a quick change oil flow bean embodying numerous novel features of construction both as to the flow disc or orifice plate, as well as the cooperating elements for said disc or plate.

Other objects include a flow bean which is simple of structure, inexpensive of manufacture, and generally superior to flow beans now known to the inventor.

With the above and other objects in view, the invention consists in the novel and useful provision, formation, construction, association and relative arrangement of parts, members and features, all as shown in a certain embodiment in the accompanying drawing, described generally, and more particularly pointed out in the claim.

Figure 2:
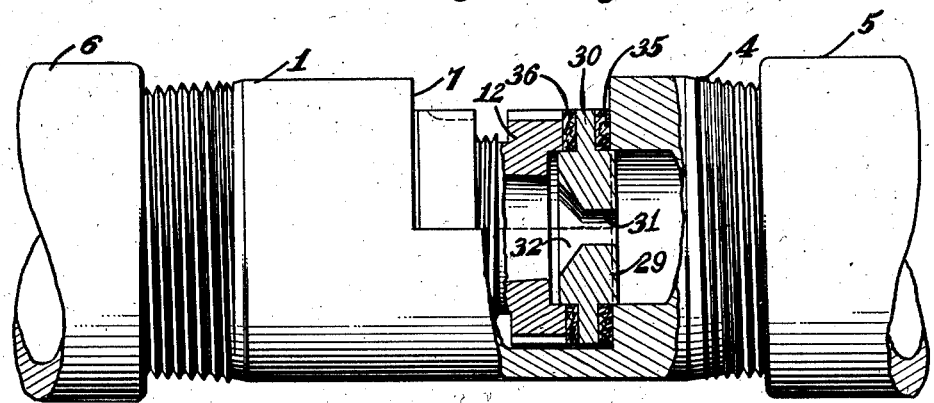
Figure 3:
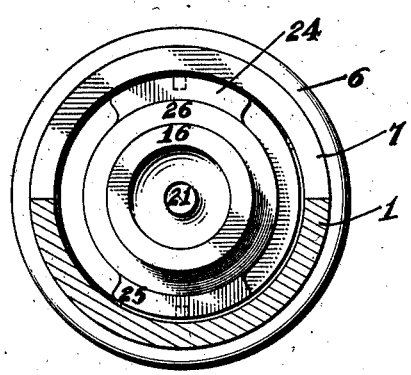

In the drawing:

Figure 1 is a longitudinal sectional view of a flow bean incorporating the invention, Figure 2 is a side elevation partly in section of the flow bean incorporating a slightly changed form of flow disc, and, Figure 3 is a front elevation partly in section of a part of the invention taken on the line 3—3 of Figure 1.

Referring now to the drawing, the improved flow bean includes a body 1 which is substantially annular in form and provided with internal screw-threads at 2. The body is likewise exteriorly provided with threads adjacent ends thereof, as shown at 3 and 4, whereby the said body may be secured to piping, shown at 5 and 6. The said body is likewise formed with a segmental slot 7. In other words, the body is semi-annularly cut away. It is also to be noticed that the body in the plane of the cut-away portion is internally reduced in diameter, as shown at 8. Furthermore, the body is internally provided with a beveled face 9 between the screw-threaded portion 2 and the part 8. What I term a locking block 10 is adapted to have threaded engagement with the threads 2, this locking block being provided with external threads at 11. Furthermore, the locking block is provided with an annular flange 12. The bore 13 of said locking block is tapered. That end of the locking block which carries the flange 12 is annularly recessed as shown at 14, and likewise an edge of said block is beveled at 15. This edge acts as a seat for that form of flow disc shown in Figure 1 at 16. Adapted for movement on the threads 11 is a lock nut 17, one end face of which is beveled as shown at 18. Both the lock nut and the flange 12 are provided with spaced flutes 19 and 20, respectively, whereby through the medium of a spanner wrench, the lock nut may be moved relative to the threads of the locking block, and the locking block likewise moved relative to the threads 2 of the body 1.

The flow disc 16 is illustrated in Figure 3 wherein 't will be seen that the flow disc includes a body having a central opening 21 and a flared mouth portion merging from said opening on one face of the disc, as shown at 22, while the opposite face of said disc is formed with an annular groove 23 surrounding the bore 21. Furthermore, the periphery of said disc is provided with a pair of diametrically disposed segmental members 24 and 25. These segmental members are of lesser width than the thickness of the disc and the disc is provided with a pair of annular inclined wall portions 26 and 27 extending from the face of said disc to the segmental portions. These inclined wall portions act as seating members for the disc against the seat 15 in one instance and an inclined seat 28 of the body 1 in the second instance.

The form of the invention shown in Figure 2 is identical with that just described, with the exception of the flow disc. In this instance, the flow disc 29 is not provided with the inclined wall portions 26 and 27. The flow disc 29 is provided with an annular rim flange 30 and the disc itself does not seat against the body or locking block 10. The disc, as before, is provided with a central bore 31 and with a flared mouth portion 32 opening on one face of the disc. The opposite face of the disc is plain, that is to say, not provided with the annular groove 23.

The operation, uses and advantages of the invention just described are as follows:

Taking first that form of the invention shown in Figure 1, if a disc of the type shown in Figure 1 is to be utilized, it may be placed in position by unscrewing the lock nut 17, or, in other words backing it relative to the locking block 10. The locking block 10 may then be turned so that the screw-threads 11 thereof will move relative to the screw-threads 2 to release the disc 16. Obviously when the locking block is moved a sufficient distance, the operator may grasp one of the flanges 24 of the disc and lift the disc outwardly through the segmental opening or cut-away portion of the body. The disc may be readily replaced by reinserting it in position and turning the locking block through the medium of a spanner wrench so that the same tightens the disc against the seats 15 and 28 of the block and the body respectively. I may provide packing 33 between the wall 9 and the inclined end 18 of the locking nut. Fluid flow is in the direction of the arrow at the right hand side of the figure, and it will be noted that the fluid will pass through the central opening or orifice 21 of the disc and expand outwardly due to the bell or flared mouth 22 thereof, and through the bore of the locking block, thence into the pipe 6. In this connection, it will be observed that one portion of said body, to-wit: the fluid entrance portion thereof, has a bore of uniform diameter 34, while the egress portion for fluid from said body has a tapered bore portion 35. In a measure, this resembles the ordinary Pitot tube. The disc construction is such as to not allow too rapid expansion of the fluid after the fluid passes through the disc and the gradually tapered bore of both the locking block and the egress portion of the body allows for further expansion of the fluid so that back pressure is relieved. I have found that the annular groove 23 of the flow disc is useful in that that flow disc is not as rapidly cut away by sand contained within oil or other liquid being passed through the central opening of the disc. Furthermore, sand does not pile up or build up around the disc when this groove is provided therein. Possibly a reason for this consists in the fact that liquid upon striking the face of the disc bearing said groove may tend to cause a fluid flow within said concavity and as a result, constantly keeps the face of the disc clean. In any event, I have found that a disc constructed in accordance with the showing of Figure 1 has long life.

It is perhaps unnecessary to go into any detailed description of other constructions to be utilized with the flow bean, as this portion is not a part of the present invention, although it is to be understood that other apparatus is to be used with the invention.

In the form of the invention shown in Figure 2, I use the same elements, as shown in Figure 1, with the exception that the flow disc is not provided with the annular groove 23 and I provide annular packing 35 and 36 between the flange 30 and the wall formed by the portion 8 and by the segmental slot, and likewise between said flange and an end of the locking block. In this instance, the diameter of the main body of the disc is such as to be received in part within the annular cut-away portion 14 of the block and the bore 34 of the body. This is a convenient arrangement and is such as to prevent, in a large measure, fluid from contacting with the packing. Obviously, a fluid-tight fit is afforded by this form of the invention.

It is apparent that although the disc 29 is not provided with the groove 23 that I may form this type of disc with the groove if desired.

The flow bean just described is particularly adaptable for oil purposes and has been found to perform very satisfactorily in actual operation in the oil fields. Primarily the flow bean is adaptable for any type of liquid but more particularly, as stated, it has been designed for use with oil.

In either event, it is evident that the flow disc may be readily removed from the body or may be locked in position within the body so that the same has fluid-tight engagement with the body and its locking means.

It is obvious that various changes and modifications and variations may be made in practicing the invention in departure from the particular showing of the drawing without departing from the true spirit of the invention.

I claim:

In a flow bean, a one-piece body member threaded for connection between pipe ends, said body being provided with a uniform bore and an outwardly tapered bore, said body being formed with a diametric transverse slot substantially separating the uniform bore from the tapered bore, a block internally threaded to said body and provided with a tapered bore communicating with the tapered bore of the body, a thin flow disc adapted to be passed through said transverse slot for position between said block and the uniform bore of the body, said body, said block and flow disc having tool engaging surfaces whereby the said parts may be held in fluid tight engagement when the block engages the flow disc; the said flow disc being provided with a uniform bore and a flared bore facing the flared bores of the block and the body, and means effecting fluid tight engagement between the said block and the said body.

THEODORE K. HOLTANE.